United States Patent [19]
Shea

[11] 4,180,138
[45] Dec. 25, 1979

[54] VEHICLE HAVING AUXILIARY DRIVE MECHANISM

[75] Inventor: Dennis W. Shea, Toledo, Ohio

[73] Assignee: Dana Corporation, Toledo, Ohio

[21] Appl. No.: 838,283

[22] Filed: Sep. 30, 1977

[51] Int. Cl.² .................. B60L 11/14; B60L 11/12
[52] U.S. Cl. .................. 180/65 A; 180/57; 180/76; 180/243; 180/245
[58] Field of Search .......... 180/44 M, 44 E, 65 R, 180/65 A, 65 C, 76, 54 C, 57; 192/48.92

[56] References Cited

U.S. PATENT DOCUMENTS

| | | | |
|---|---|---|---|
| 967,006 | 8/1910 | Feile | 180/76 X |
| 1,742,610 | 1/1930 | McGrew | 192/43 X |
| 2,384,470 | 9/1945 | Keese et al. | 180/54 C |
| 2,384,781 | 9/1945 | Rockwell et al. | 180/54 C |
| 3,053,043 | 9/1962 | Knowler | 180/44 M X |
| 3,057,427 | 10/1962 | Glasgow | 180/44 M |
| 3,502,165 | 3/1970 | Matsukata | 180/65 A X |
| 3,650,345 | 3/1972 | Yardney | 180/65 A |
| 4,042,056 | 8/1977 | Horwinski | 180/65 A |

FOREIGN PATENT DOCUMENTS 2127111  12/1971  Fed. Rep. of Germany ............ 180/60

*Primary Examiner*—Joseph F. Peters, Jr.
*Assistant Examiner*—Milton L. Smith
*Attorney, Agent, or Firm*—Robert M. Leonardi

[57] ABSTRACT

A vehicle has a forward mounted primary gasoline engine operatively engaged with the front axle and its associated wheels. The vehicle also has a rear mounted second motor drivingly engaged with the rear axle which is normally a dead axle. The rear axle is selectively drivingly engageable with the rear wheels which can overrun the rear axle in both the forward and reverse directions. The second motor is preferably an electric motor operable in two directions but alternatively may be a hydraulic pump/motor. The second motor, which may be driven by the primary motor or from an independent power source such as a battery, is manually actuable by the vehicle operator and automatically disengageable upon reaching a predetermined speed.

8 Claims, 4 Drawing Figures

VEHICLE HAVING AUXILIARY DRIVE MECHANISM

BACKGROUND OF THE INVENTION

This invention relates generally to vehicles and more particularly to vehicles having both a primary motor and an auxiliary motor.

As is well known, conventional vehicles such as passenger cars sometimes become stalled in mud or snow or on ice when the drive wheels, usually the rear wheels, lose traction. With the increasing popularity of compact passenger vehicles, traction problems under such adverse conditions have become more common. Compact and subcompact vehicles are specially designed to be light in weight and traction problems are therefore inherent. Furthermore, compacts and subcompacts generally have small tires and wheels which, as is well known, have relatively high rolling resistance. The increased use of plastics and other lightweight materials in these and other vehicles has made such traction problems even more widespread.

Traditional passenger cars having two-wheel drive are especially susceptible to stalling under adverse road conditions. It has long been known that full-time four-wheel-drive vehicles, such as military or recreational vehicles, are especially adapted for travel under adverse road conditions. Such full-time four-wheel-drive vehicles are provide with front and rear drive axles operatively and drivingly connected to a single mover such as a gasoline engine. Vehicles have also been designed with part-time four-wheel-drive capabilities. In these vehicles wheel locks or clutches are manually or automatically selectively engageable to transform the vehicle from a two-wheel-drive to a four-wheel-drive system. Although full or part-time four wheel-drive vehicles have proved highly successful in specific situations, the large drive mechanisms used in these vehicles are generally unsuitable in size and weight for the presently popular compact and subcompact vehicles.

SUMMARY OF THE INVENTION

It is an object of the present invention to provide a vehicle having a lightweight auxiliary drive system.

It is a further object of the present invention to provide a vehicle having a primary mover and an auxiliary mover.

It is still a further object of the present invention to provide a vehicle which is selectively driveable through two axles.

These and other objects of the present invention which will become apparent from the following detailed description are achieved by a vehicle having a primary mover adapted for driving engagement with a first axle which is drivingly engaged with a first wheel. The vehicle further comprises a secondary mover drivingly engaged with a second axle which is selectively drivingly engageable with a second wheel. Preferably, the secondary mover comprises an electric motor which is operable in two directions. The secondary mover may be manually actuatable by the vehicle operator and automatically disengageable upon the vehicle reaching a predetermined speed. The secondary mover may be driven by the primary mover or may be operable from an independent power source such as a battery. The second axle is a dead axle when the secondary mover in inoperative. The second wheel therefore comprises means for overrunning the second axle, preferably in two directions.

DETAILED DESCRIPTION OF A PRESENTLY PREFERRED EMBODIMENT

Figure 1:
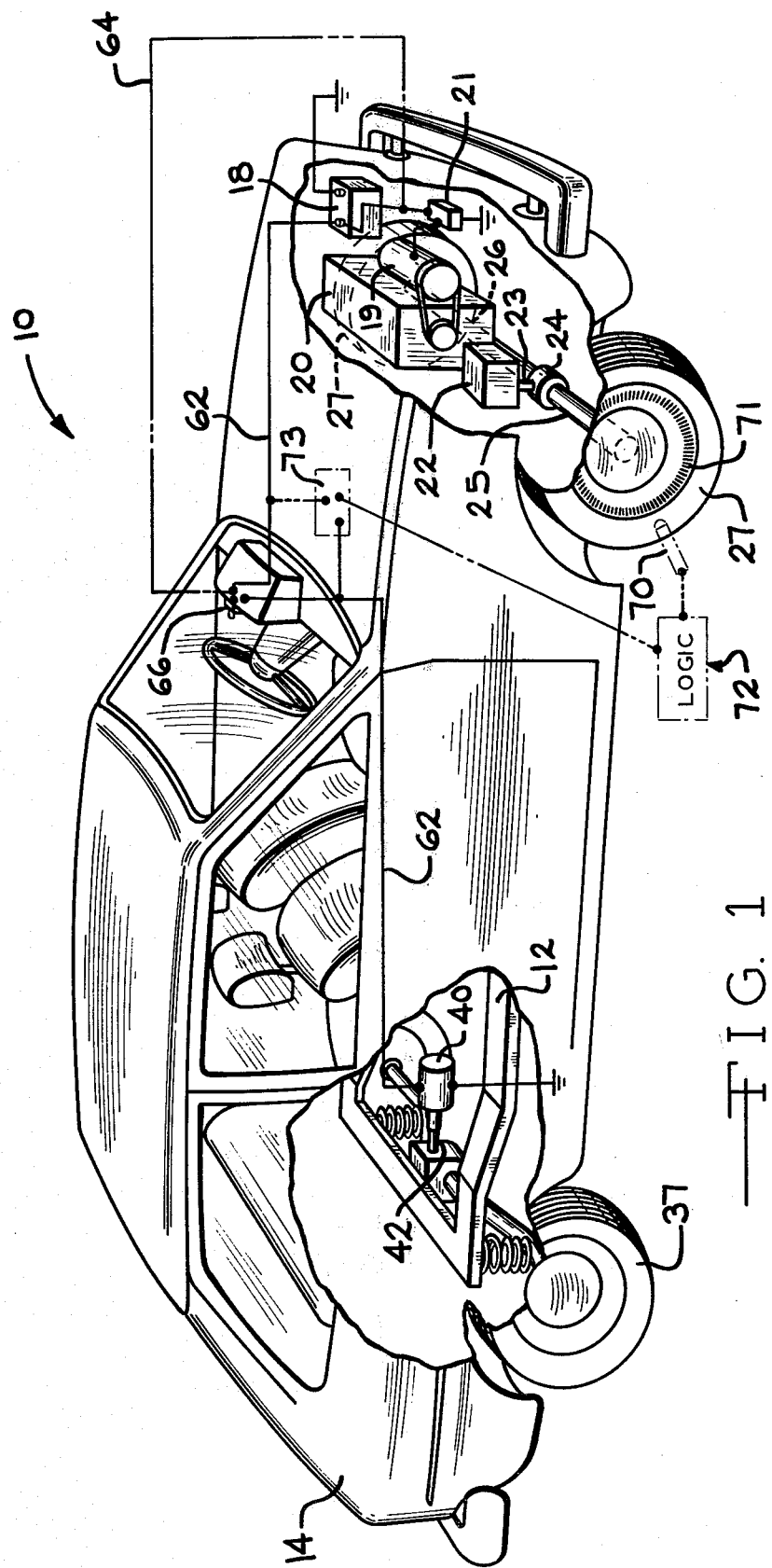
FIG. 1 is an isometric view of a vehicle having the auxiliary drive system of the present invention, a portion of the vehicle being broken away to show the chassis components.

Referring to FIG. 1, a subcompact passenger vehicle 10 is shown having a frame 12 upon which is secured the vehicle body 14. The vehicle 10 has a forward mounted primary mover 20 which is a gasoline engine in the presently preferred embodiment. Power for starting the engine 20 is supplied by a twelve volt battery 18. Much of the electrical system for starting the engine 20, as for instance the starter and associated wiring, has not been illustrated in FIG. 1 as it is well known in the art. An electrical generator 19, driven by the engine 20, is adapted to recharge the battery 18 through a voltage regulator 21 and to supply electrical power to various electrical accessories in the vehicle such as a radio, heater, lights, etc.

In the presently preferred embodiment, a manual transmission 22 is drivingly connected to the engine output shaft (not shown). It should be noted, however, that the present invention may readily be utilized with a vehicle having an automatic transmission. A transmission output shaft 23 extends downwardly from the bottom of the transmission 22 into a right angle differential unit 24. Right and left front drive axles 25 and 26 are drivingly engaged with the transmission output shaft 23 through the drive unit 24 and with the front drive wheels 27. The transmission 22 permits both forward and reverse drive of the axles 25 and 26 as is well known in the art. The mechanism for steering the front wheels 27 is not illustrated in FIG. 1 as it too is well known in the art.

Figure 2:
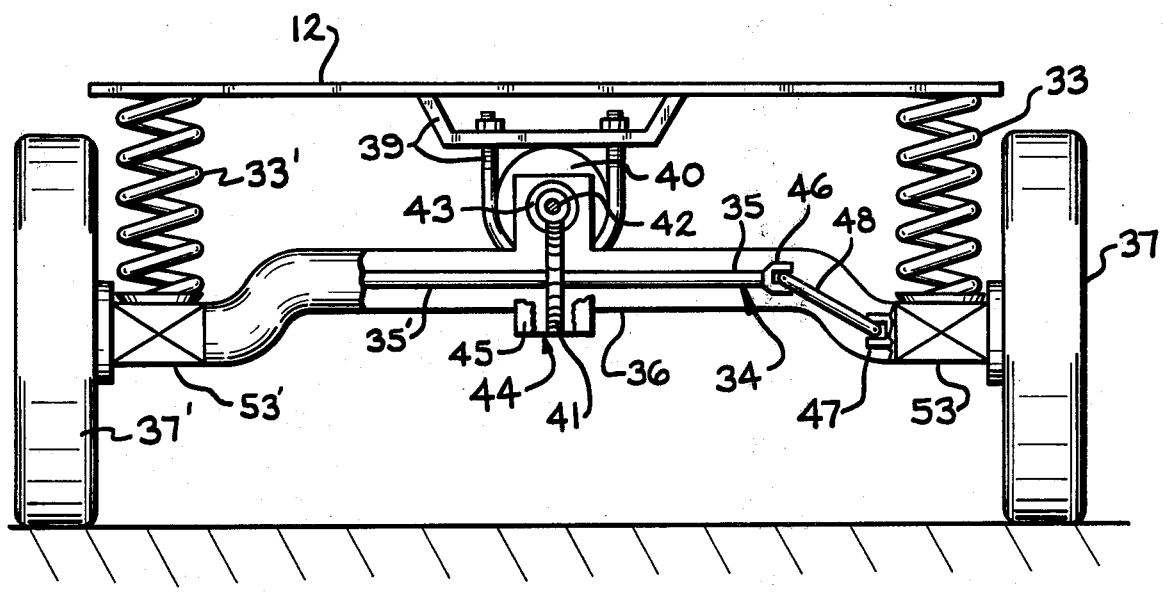
FIG. 2 is a rear elevation view of the rear wheel and axle assembly of the vehicle of FIG. 1.

As can more clearly be seen in FIG. 2 the vehicle 10 has a selectively drivable rear axle assembly 34 contained within a rear axle housing 36 which extends between the right and left rear wheels 37 and 37'.

The rear axle housing 36 is bent upward near the center of the vehicle to provide additional ground clearance, but it should be understood that a straight axle is within the scope of the present invention. The right side of the axle assembly 34 includes right axle shafts 35, 48 and 50 (see FIG. 3) drivingly connected in series by universal joints 46 and 47. The left side of the axle assembly 34 comprises an identical series of axle shafts, including shaft 35', which operate in a manner similar to the right side of the axle assembly.

A secondary, electric motor 40 is rigidly affixed to the rear portion of the frame 12 above the rear axle assembly 34 by brackets 39. The frame 12 is connected to the rear axle housing 36 by rear springs 33 and 33' which act to cushion the frame and the secondary mover 40 from jolts due to adverse road conditions.

A telescoping slip shaft 42 (see also FIG. 1) extends from the electric motor 40 into a right angle drive unit 44. The shaft 42 is adapted to accommodate any variation in distance between the motor 40 and the axle housing 36, such as those caused by adverse road conditions. The shaft 42 should be designed to telescope a distance as required to accommodate anticipated axle movement.

The drive unit 44 includes a housing 45 integral with the axle housing 36. The drive unit 44 comprises a worm gear 41 rigidly connected to the axle shafts 35 and 35'. The worm gear 41 is thereby adapted to drive both the right and left wheels 37 and 37' as will be described. The unit 44 also comprises a worm 43 operatively drivingly engaged with the worm gear 41. The worm 43 is affixed to the telescoping shaft 42 which extends from the motor 40 and is adapted to be driven thereby.

It should be noted that other types of drive systems can easily be adapted to replace the drive unit 44. For instance, other types of gearing such a spiroid, helicoid, or planetary gearing could be used, as well as belt or chain drive systems either alone or in combination with gearing. The worm and worm gear system disclosed is presently preferred because of its high torque ratio.

When the electric motor 40 is inoperative, the entire axle assembly 34, including the axle shafts 35, 35', 48 and 50, remains stationary. In other words, the axle assembly 34 is normally a "dead" axle. The associated rear wheel end assemblies must therefore be adapted to permit free rotation of the rear wheels 37 and 37' when the rear axle is stationary.

Figure 3:
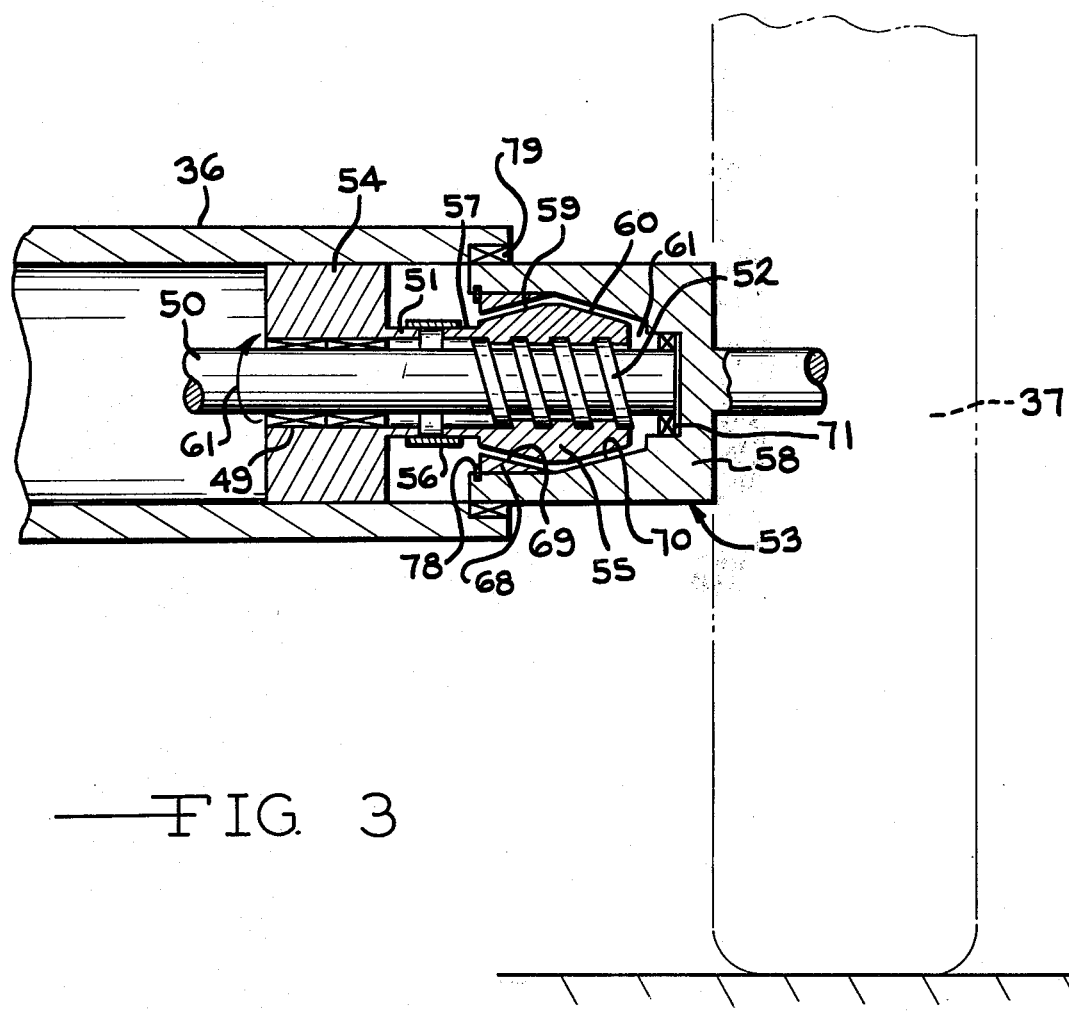
FIG. 3 is a cross-sectional elevation view of the right rear wheel end assembly of the axle in FIG. 2.

Referring to FIG. 3, the right end axle shaft 50 has right hand threads 52 near its outer end portion. The wheel end assembly 53 includes a stationary member 54 which is rigidly secured to the axle housing 36 and which contains a set of bearings 49 for radially aligning the axle shaft 50.

A threaded steel input clutch member 55 is screwed onto the threaded outer portion of the axle shaft 50. The input clutch 55 has two frusto conical surfaces 59 and 60, each tapering away from the other. The stationary member 54 has an annular protuberance 51 extending axially outwardly toward the wheel 37. An annular drag spring 56 is rigidly secured to the protuberance 51 and is slidably engaged with an annular axially inward extension 57 of the input clutch member 55.

A two piece output clutch is rigidly connected to the right rear wheel by means (such as bolting) well known in the art. The output clutch members 58 and 68 are held rigidly together by a clip 78. Together the members 58 and 68 define a cavity 61 in which the input clutch member 55 is contained. The output clutch member cavity 61 is defined in part by two frusto conical clutching surfaces. Surface 69 on clutch member 68 and surface 70 on member 58 are adapted for frictional engagement with the input clutch member surfaces 59 and 60, respectively. The output clutch is made in two components 58 and 68 to permit insertion of the input clutch 55 within the output clutch cavity 61. Output clutch member 58 also houses a bearing assembly 71 for radially aligning the shaft 50. The housing member 36 houses a bearing assembly 79 for radially aligning the output clutch member 58.

When the axle shaft 50 is driven in a forward direction (as indicated by the arrow 61 in FIG. 3) the input clutch member 55 is held rotationally stationary by the drag spring 56. The clutch member 55 is therefore screwed outwardly (rightwardly as viewed in FIG. 3) on the input shaft 50 towards the wheel 37 until the input clutching surface 60 frictionally engages the output clutching surface 70. At this point the input clutch member 55 is locked between the input shaft 50 and the output clutch member 58. The locked driving relationship between these members exists as long as the output clutch member 58 continues to drive the wheel 37. In this condition the drag spring force is overcome by the driving forces and the input clutch rotates with the shaft 50 and wheel 37.

If the driving force applied by the axle shaft 50 should cease, as for example by stopping the auxiliary motor 40 or by rotating the wheel 37 faster than the rotation on the input shaft 50, the wheel 37 is free to overrun the input shaft 50. When the wheel 37 overruns the shaft 50, the output clutch member 58 turns the input clutch member 55 in the forward direction 61 relative to the shaft 50 because of the frictional engagement of the clutch members 55 and 58. The output clutch member 58 therefore moves the input clutch member 55 axially inwardly on the threaded shaft 50, disengaging the clutch surfaces 60 and 70.

As the input shaft 50 continues to rotate, the drag spring 56 holds the input clutch member 55 rotationally stationary causing it to reverse its direction and move axially outwardly toward the wheel 37, thereby reengaging the output clutch member 58. If the rotational speed of the input shaft 50 is less than that of the output clutch member 58, the input member 55 will be bumped out of engagement each time the drag spring 56 and the shaft 50 attempt to engage the surfaces 60 and 70. If the wheel 37 slows to a speed less than that of the shaft 50, the clutch surfaces 60 and 60 are re-engaged as previously described and the wheel is again driven.

When the auxiliary motor is stopped for any reason, the input shaft 50 will also stop and the wheel 37 will overrun the input shaft 50 as just described. As the wheel 37 continues to rotate it disengages the input clutch member 55 from the output clutch member 58. Because the shaft 50 is stopped, the drag spring 56 retains the clutch member 55 between the surfaces 69 and 70 of the output member 58 and no bumping occurs between the members 55 and 58.

A reverse rotation of the axle shaft 50 causes engagement of the clutch surfaces 59 and 69 whereby the wheel 37 is driven in the reverse direction. Overruning in the reverse direction is accomplished similarly to that in the forward direction.

It should be noted that the wheel end assemblies will be operative regardless of whether the wheel end shafts such as 50 have right or left hand threads, as this will only change which clutching surfaces are engaged for forward and reverse operation. It should also be noted that the wheel end assemblies 53 and 53' are essentially identical and simultaneously drive the wheels 37 and 37', respectively. Because of the overruning capabilities of each assembly 53 and 53', no differential gearing is necessary, as the slow wheel will always be driven while the faster wheel overruns.

The preferred auxiliary motor circuit is provided with means for disengaging the input clutch member 55 from the output clutch members 58 or 68 when the auxiliary motor 40 is deactivated. Disengagement of the clutch members is accomplished by momentarily rotating the wheel end shaft 50 in the direction opposite that in which it was driving. This brief rotation, one-quarter turn for example, in the opposite direction assures that the input clutch member 55 frees itself from locking frictional engagement with the output clutch. Such a locking condition could cause the entire system to be backdriven, possibly resulting in damage to the system. The presently preferred electrical circuit for accomplishing this disengagement will be described hereinafter.

Referring again to FIG. 1, the auxiliary electric motor 40 is electrically connected directly to the battery 18. It is therefore possible for the auxiliary motor 40 to be driven for short periods by the battery 18 without the engine 20 being in operation. An auxiliary motor on/off switch 66 interrupts the electrical line 62 and is conveniently located in the vehicle operator's compartment. It is sufficient for most anticipated situations that the battery 18 be operative to move the vehicle at a speed of about 5 m.p.h. for a distance of up to two to three hundred yards before requiring a recharge. However, if the engine 20 is running, the generator 19, through the voltage regulator 21, continuously recharges the battery 18 and the electric motor 40 is in effect driven by the primary mover. Alternatively, the electric motor 40 may be electrically connected directly to the voltage regulator 21 and generator 19 by the wires 64 shown in phantom in FIG. 1. In this alternative mode the secondary mover 40 can be activated only when the primary mover 20 is in operation.

In the presently preferred embodiment the auxiliary drive motor 40 is a 12 Volt DC reversible split series electric motor. It may be run in either the forward or reverse direction. The motor 40 is controlled by a relay logic system using a multitude of relays, switches, diodes, capacitors and system status lights. A preferred electrical circuit for operation of the auxiliary motor system of the presently preferred embodiment is illustrated in FIG. 4.

Figure 4:
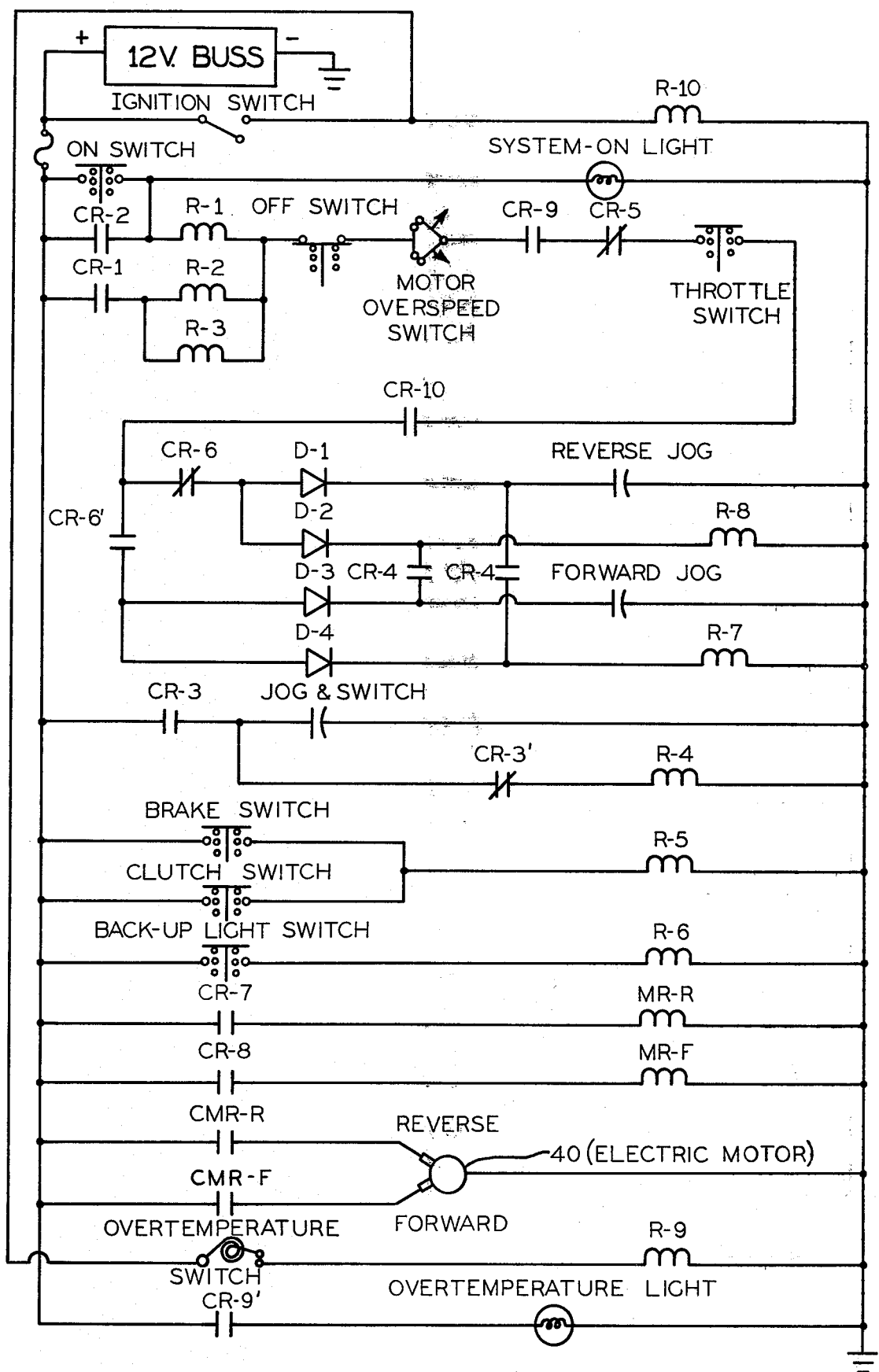
FIG. 4 is a schematic diagram of an electrical circuit for the auxiliary drive system of the present invention.

In FIG. 4, all relays are depicted as coils and are denoted "R" (e.g. R-1, R-2, etc.). Each relay is operative to act upon a corresponding set of contact points denoted "CR" (e.g., CR-1, CR-2, etc.).

Power to the electric motor 40 is supplied from the positive terminal of a 12-volt buss battery. To activate the auxiliary electric motor 40, the ON SWITCH must momentarily be depressed to complete the circuit. This activates the SYSTEM-ON LIGHT. Current from the battery flows through relay R-1 which closes the normally open contact CR-1 and allows current from the battery to flow through relays R-2 and R-3. Normally open contact CR-2 is therefore closed, bypassing the ON SWITCH after it springs to its normally open position. The auxiliary system can thereby operate without the ON SWITCH being closed throughout operation. Current through relay R-3 simultaneously closes normally open contact CR-3 and opens normally closed contact CR-3' which effects a charging of the JOG AND SWITCH capacitor. The operation of the JOG AND SWITCH portion of the circuit will be described hereinafter.

Before current can reach the motor 40, it must pass through the OFF SWITCH and the MOTOR OVERSPEED SWITCH, which are both normally closed, to the normally open contact CR-9. Contact CR-9 is closed by relay R-9 when it is activated by current passing from the battery through the OVER-TEMPERATURE SWITCH. The OVER-TEMPERATURE SWITCH is normally closed unless the motor 40 overheats. Current must also pass through normally closed contact CR-5 which may be opened by relay R-5 if the vehicle brake pedal is depressed, or by closing the CLUTCH SWITCH. In a vehicle having an automatic transmission the CLUTCH SWITCH would of course be omitted.

On its path to the auxiliary motor 40 current must pass through the THROTTLE SWITCH, which is closed by a slight depressing of the throttle, to the normally open contact CR-10. Relay R-10 closes the contact CR-10 when the IGNITION SWITCH is closed by the vehicle operator turning the vehicle ignition to the "on" position.

With all of the previously mentioned switches and contacts closed the current can reach the contacts CR-6 which is normally closed and CR-6' which is normally open. When the electric motor 40 is operated in the forward mode the contact CR-6 remains closed with the current thereby passing through the diodes D-1 and D-2. Current passing through diode D-1 charges the REVERSE JOG capacitor. Current passing through the diode D-2 activates relay R-8 which closes the contact CR-8. Current is then permitted to pass through relay MR-F which closes contact CMR-F, thereby completing a current path from the battery to the FORWARD terminal of the motor 40.

To operate the electric motor 40 in the reverse mode, the manual transmission 22 is shifted into reverse. The reverse setting in the transmission closes the BACKUP LIGHT SWITCH, thereby activating the relay R-6 which opens the contact CR-6 and closes the contact CR-6'. Current is therefore prevented from passing through diodes D-1 and D-2 and is permitted to pass through the diodes D-3 and D-4. Current passing through diode D-3 charges the FORWARD JOG capacitor. Current passing through the diode D-4 activates the relay R-7 which closes the normally open contact CR-7. The relay MR-R is therefore activated, which closes the contact CMR-R and completes the circuit to the REVERSE terminal of the electric motor 40 and drives the motor in the reverse direction.

Several safety features are built into the auxiliary motor circuit as illustrated in FIG. 4. For example, the IGNITION SWITCH must be turned on before the system can be activated. Furthermore, as previously described, the operator must be touching the accelerator pedal to close the THROTTLE SWITCH and must be partially engaging the clutch to open the CLUTCH SWITCH. If any of these switches change position during operation of the auxiliary motor 40, current flow to the motor will immediately cease. It can therefore be seen that the vehicle operator must be in the driver's seat and poised for operation of the vehicle before the system can be activated. The safety features alleviate the problems of an inadvertent switching on of the auxiliary system which may cause an accident if the vehicle is in a location with narrow clearance, such as a garage or in heavy traffic.

Further safety factors are also built into the auxiliary motor circuit. For example, the centrifugal MOTOR OVERSPEED switch breaks the circuit, therefore cutting off current flow to the motor 40, when the motor reaches a predetermined speed. Heating of the motor over a predetermined temperature causes the OVER-TEMPERATURE SWITCH to open, thereby deactivating the relay R-9 which closes the contact CR-9', illuminating the OVER-TEMPERATURE LIGHT, and opening contact CR-9 thereby terminating current flow to the motor 40.

As previously noted, when the electric motor is activated in either the forward or reverse direction, the REVERSE JOG or the FORWARD JOG capacitor, respectively, is charged. Current ceases to flow through relay R-3, when the circuit leading to the electric motor 40 is broken, as for example by the OVERSPEED SWITCH, OVERTEMPRATURE SWITCH, or OFF SWITCH. Contact CR-3 therefore returns to its normally open position while contact CR-3' returns to its normally closed position. The charged JOG AND SWITCH capacitor discharges through the relay R-4 which momentarily closes the normally open contacts CR-4. The charged REVERSE JOG or FORWARD JOG capacitor therefore discharges through the relay R-7 or R-8, respectively. The pulse of current passing through the relays R-7 or R-8 momentarily closes the contact CR-7 or CR-8, respectively. This permits a pulse of current to momentarily drive the electric motor 40 in the reverse or the forward direction, respectively, thereby disengaging the wheel end clutch assembly as previously described.

Under actual driving conditions, if front wheel of the vehicle 10 of the present invention is stalled on ice for example, the auxiliary system may be utilized. To activate the system the driver leaves the ignition switch on, slightly touches the throttle, and begins to release the clutch. He then depresses the auxiliary SYSTEM-ON SWITCH, with the SYSTEM-ON LIGHT indicating such, which fully connects the circuit of the auxiliary drive motor 40. Rotation of the motor 40 then begins in the selected direction with the motor 40 driving the rear axle as previously described.

When the vehicle is out of the road incumberance, the auxiliary motor 40 may be deactivated by the OFF SWITCH which breaks the auxiliary motor circuit shown in FIG. 4. If the driver fails to manually deactivate the system, the MOTOR OVERSPEED SWITCH automatically breaks the circuit when the auxiliary motor reaches a predetermined speed. The BRAKE SWITCH will also deactivate the system upon a slight touching of the brake pedal.

It should further be noted that the auxiliary system of the present invention may be modified such that the auxiliary motor 40 is automatically activated upon slippage of the drive wheels. Such an automatic auxiliary drive system requires means for determining when the front drive wheels are slipping. One such means is a wheel speed sensing device such as a magnetic pickup 70 (illustrated in phantom in FIG. 1) which "reads" equally circumferentially spaced teeth, ridges or other surface deviations 71 on the drive wheel 27 or on a ring attached thereto. Output from the sensor is fed through a logic portion 72 of the system which compares wheel speed changes with a predetermined programed permissible speed variation range. Upon deviation from the permissible range the logic 72 activates a switch 73 which connects the wires 62, thereby completing the circuit from the battery 18 to the auxiliary motor 40. The logic 72 is also adapted to open the switch 73 when the wheel slip condition is terminated. Wheel speed sensing devices as described are presently utlized on anti-skid braking systems which are presently available for passenger automobiles and trucks. Such anti-skid braking systems could easily be adapted to automatically activate the auxiliary motor system of the present invention.

It should be noted that other types of auxiliary motors such as hydraulic pump/motors may be utilized in the vehicle of the present invention. Hydraulic pump/motors are well known in the art and have often been utilized in systems involving vehicle power transmission. Hydraulic auxiliary movers generally derive their power from the primary motor and thereby may only be utilized in applications when such derivative power is sufficient. However, hydraulic pump/motors may be switched from a forward drive direction to reverse drive direction merely by the switching of hydraulic valve.

The structure previously described has been for the purpose of illustrating a presently preferred embodiment of the invention. It should be understood that many other modifications or alterations may be made without departing from the spirit and the scope of the invention as set forth in the appended claims.

I claim:
1. A vehicle comprising:
a first wheel and a first axle adapted for operative driving engagement with said first wheel;
an internal combustion engine adapted for operative driving engagement with said first axle;
generating means driven by said internal combustion engine;
a battery adapted to be charged by said generating means;
a second wheel, a second axle said second wheel being selectively rotatable relative to said second axle and means for selectively drivingly engaging said second axle with said second wheel;
an electric motor drivingly engaged with said second axle and selectively drivingly engageable with said second wheel through said second axle upon actuation of said electric motor, said electric motor drivingly connected to said battery; and
means for selectively actuating and deactuating said electric motor.
2. A vehicle as defined in claim 1 further comprising:
means for automatically disengaging said engaging means upon deactuation of said electric motor.
3. A vehicle as defined in claim 1 wherein said electric motor is operable in a forward direction mode and a reverse direction mode.
4. A vehicle as defined in claim 3 further comprising a transmission operatively drivingly connecting said engine and said first wheel, said transmission having a reverse mode, and a back-up light switch actuated when said transmission is in said reverse mode, and means for switching said electric motor into said reverse direction mode when said back-up light switch is actuated.
5. A vehicle as defined in claim 1 further comprising means for automatically deactuating said electric motor when said motor reaches a predetermined speed.
6. A vehicle as defined in claim 1 further comprising a throttle for governing said engine, wherein said electric motor is inoperable when said throttle is in its free standing state.
7. A vehicle as defined in claim 1 further comprising an ignition switch actuatable for starting said engine, wherein said electric motor is inoperable when said ignition switch is unactuated.
8. A vehicle as defined in claim 1 further comprising a brake actuatable for braking said vehicle, wherein said electric motor is inoperable when said brake is actuated.

* * * * *